M. MÜNZNER.
FABRIC SCALE.
APPLICATION FILED AUG. 16, 1911.

1,031,954.

Patented July 9, 1912.

WITNESSES:

INVENTOR:
Max Münzner,
By Attorneys,

UNITED STATES PATENT OFFICE.

MAX MÜNZNER, OF NEWARK, NEW JERSEY, ASSIGNOR TO THE TORSION BALANCE COMPANY, OF NEW YORK, N. Y., A CORPORATION OF NEW YORK.

FABRIC-SCALE.

1,031,954.  Specification of Letters Patent.  Patented July 9, 1912.

Application filed August 16, 1911. Serial No. 644,369.

*To all whom it may concern:*

Be it known that I, MAX MÜNZNER, a citizen of the United States, residing in Newark, in the county of Essex and State of New Jersey, have invented certain new and useful Improvements in Fabric-Scales, of which the following is a specification.

This invention aims to provide a scale for the weighing of textile or other fabrics (including paper or cardboard) whereby to ascertain from a prescribed sample of the fabric the weight of varying widths of fabric for a given standard length. In the case of cloth for example, it is desired to determine by weighing a sample, what is the weight of the cloth per running yard. As cloth of a given weight per unit of area may be made in varying widths, it is desirable to provide a scale which will show without computation the weight per running yard for any width that may be taken.

According to the present invention a sample of the fabric of standard size is cut, and this is placed upon the scale beam in the position which is determined by the width of the cloth in the piece, so that the weight of the sample acts upon the beam at greater or lesser mechanical advantage according as the piece fabric is of greater or lesser width. The precise position to which the sample to be weighed is thus adjusted, is determined by a special scale graduated in inches or other units to show the width of the piece fabric. The scale is then brought to balance by means of a sliding weight on the scale beam. The beam is graduated so that the position of this sliding weight when the scale balances, indicates the exact weight of the piece goods per running yard, this weight being expressed in ounces or other units. The construction and arrangement are such that the operation of thus weighing a sample is very expeditious and extremely accurate, provided only that the sample be cut accurately to size.

Figure 1:
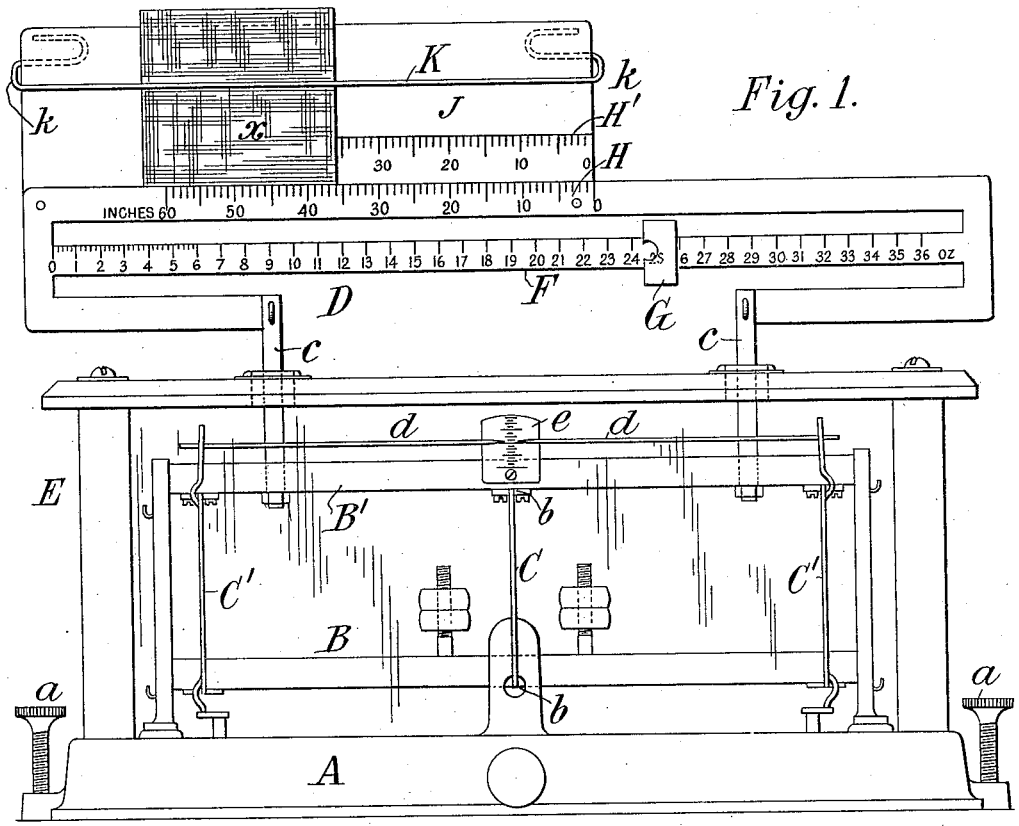
Figure 3:
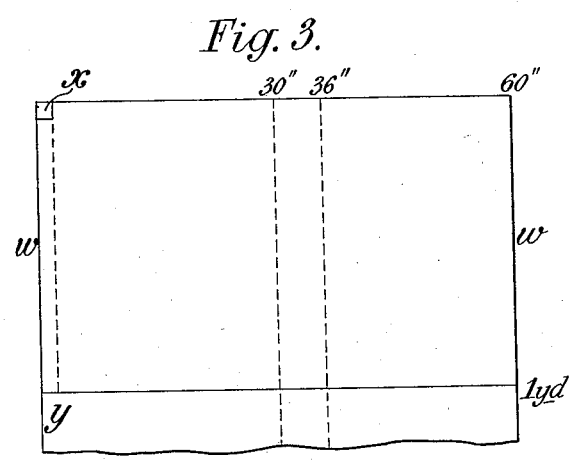
Figure 2:
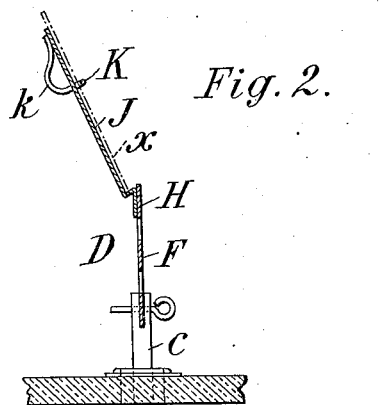

Figure 1 of the accompanying drawings is a front elevation of a scale embodying this invention; Fig. 2 is a fragmentary vertical transverse section; Fig. 3 is a diagram illustrating the principle of the weighing operation.

The particular type of weighing scale shown in the drawing is a torsion balance, the construction of which is so well known as to require no description.

Let A designate a base or support of any suitable kind, which may advantageously have leveling screws $a\ a$. Let B B' designate the scale beams, which in the construction shown are centrally pivoted at $b\ b$ on torsion wires held in a stationary truss C, the beams being connected at their ends by torsion trusses C' C'. Upon the upper beam B' is mounted a graduated frame D. In the construction shown the torsion scale devices are inclosed in a casing E having glass sides and top. In such form of scale the graduated frame D is connected to the scale beam B' through the medium of upright rods $c\ c$ which pass freely through holes in the glass top of the case. The scale has the usual pointers $d\ d$ to show when it is in balance, their ends traversing a graduated plate $e$. The constructional features thus far described (other than the frame D) present no novelty and are immaterial to the present invention, and may be substituted by any other desired kind of scale construction.

The weighing frame D comprises a graduated weighing beam F on which moves a slide weight G, and a graduated scale H which is associated with a sample holder J. The sample holder may be variously constructed, being shown as a light metal plate forming a sort of scale pan to receive the sample of fabric. It is desirable to provide this also with a light holding spring to prevent displacement of the sample of fabric. Such a spring is shown at K, being formed to cross the face of the holder plate and to curve around and be fastened to the back thereof, having preferably a rearwardly projecting portion $k$, at each end, by pressing upon which the front portion of the spring K may be pressed forward free from the holder plate to permit the insertion or removal of the sample.

The graduations on the beam F and the graduations on the scale H are arranged inversely. The arrangement shown in a suitable one, where the scale H is graduated in inches of width of the piece fabric, and the beam F is graduated to indicate ounces per running yard of fabric.

In Fig. 1, $x$ shows the sample of fabric to be weighed. This sample must be of a determined size, as upon this depends the graduation of the scale H, as well as that of the beam F. Assume for example that the prescribed sample is a piece of fabric 2 inches square. The relation of such sample to the entire fabric is shown by the diagram Fig. 3, where x is the sample and w w are the selvage edges of a fabric which in this case is shown at 60" wide, this being the widest fabric for which the scale shown in the drawings is designed. Examples of narrower widths of piece fabric are shown by the dotted lines 30" and 36" to show respectively 30-inch and 36-inch widths. The length of a running yard is shown by the dotted line marked 1 yd. The sample x might be cut off the corner of the piece, but it is preferable for exactness to cut it out by means of a die.

The sample having been accurately cut to the desired size, the weighing operation is performed as follows, the scale having been first accurately balanced by means of the leveling screws a a or otherwise.

The sample is placed upon the holder J as shown in Fig. 1 with its right hand edge at that point of the scale H which corresponds to the width of the piece of goods. In Fig. 1 the sample is shown as properly placed for piece goods of one yard in width, its right hand edge being at the point 36 on the scale H. The weighing operation is then performed by sliding the slide weight G along the beam F until the scale comes to poise. The position of the slide weight G then indicates the weight per running yard of the goods; for example in the position shown in Fig. 1, it indicates that the piece goods of 36" width weighs 24.5 ounces per running yard.

For accurate weighing care should be taken that the sample x is placed exactly parallel upon the supporting plate J, that is to say, so that its center of gravity shall come over a point midway between its lower corners.

The principle is apparent from a consideration of the diagram Fig. 3. The sample x is 1/18th of a yard in length, and if the goods were a ribbon 2 inches wide as shown by dotted line y, the sole function of the scale would be to multiply the weight of the sample x by 18 to give the weight of the running yard of goods. But whenever the goods exceeds this width, the scale has a further function, namely, to multiply the weight as many times as the ratio to the width of the sample of the width of the piece goods. That is to say, if the piece goods is 30" wide, the weight of the sample is multiplied not only by 18 but also by 15; if 36" wide, then by 18 and 18; and if 60" wide, then by 18 and 30. This latter multiplication is accomplished by setting the sample x to different distances from the center or neutral point of the weighing beam. When set at zero its center of gravity comes directly over the center of gravity of the scale beam, so that the weight indicated would be zero; as the sample is moved toward the left or up the scale H, it acquires greater mechanical advantage and thereby its displacement automatically multiples the weight indicated according to the ratio just stated.

Of course the graduations require to be changed in case the sample to be weighed is of different size, or in case the running length of the goods is to be according to some other measurement than one yard, or in case the slide weight G is of greater or lesser weight; or in case of any other material change in conditions.

The sample holder may be varied in construction, its essential function being to hold the sample in definite relation to the weighing scale, and to permit it to be readily adjusted along the scale H according to the width of the piece goods the weight of which is to be determined from the sample.

The scale H may be variously arranged, provided it is in juxtaposition to the sample holder; for example, it may be marked on the sample holder, as shown at H'.

I claim as my invention:—

1. A fabric scale comprising a weighing beam having graduations corresponding to various widths of piece goods, a sample holder adapted to support a sample in various positions along said graduations, said beam graduated for reading the weight of the piece goods, and a weight adjustable along the same for counterbalancing the sample, said graduations and weight proportioned as described, whereby by positioning said sample according to the width of the goods and counterbalancing the scale by said weight, the position of the latter will indicate the weight per unit of length of the goods having such width.

2. A fabric scale comprising a weighing beam having graduations corresponding to various widths of piece goods, a sample holder rigidly attached to said beam adapted to support a sample in various positions along said graduations, said beam graduated inversely to said width graduations for reading the weight of the piece goods, and a weight adjustable along the same for counterbalancing the sample.

3. A fabric scale comprising a weighing beam having graduations corresponding to various widths of piece goods, a sample holder adapted to support a sample in various positions along said graduations, said sample holder comprising an inclined plate for supporting the sample adjacent to such graduations, said beam graduated for reading the weight of the piece goods, and a weight adjustable along the same for counterbalancing the sample.

4. A fabric scale comprising a weighing beam having graduations corresponding to various widths of piece goods, a sample holder adapted to support a sample in various positions along said graduations, said sample holder comprising a plate and a spring for clamping the sample against said plate, said beam graduated for reading the weight of the piece goods, and a weight adjustable along the same for counterbalancing the sample.

5. A fabric scale comprising a weighing beam having graduations corresponding to various widths of piece goods, a sample holder adapted to support a sample in various positions along said graduations, said sample holder having a spring clip for yieldingly holding the sample in place, said beam graduated for reading the weight of the piece goods, and a weight adjustable along the same for counterbalancing the sample.

In witness whereof, I have hereunto signed my name in the presence of two subscribing witnesses.

MAX MÜNZNER.

Witnesses:
THOMAS F. WALLACE,
RENÉ BRUINE.

Copies of this patent may be obtained for five cents each, by addressing the "Commissioner of Patents, Washington, D. C."